US009791192B2

(12) United States Patent
Ronga

(10) Patent No.: US 9,791,192 B2
(45) Date of Patent: Oct. 17, 2017

(54) DEVICE FOR CHARGING PRESSURIZED SYSTEMS

(75) Inventor: Luca Ronga, Brescia (IT)

(73) Assignee: ERRECOM S.R.L., Corzano (IT)

(*) Notice: Subject to any disclaimer, the term of this patent is extended or adjusted under 35 U.S.C. 154(b) by 610 days.

(21) Appl. No.: 14/355,187

(22) PCT Filed: Oct. 31, 2011

(86) PCT No.: PCT/IT2011/000366
§ 371 (c)(1),
(2), (4) Date: Aug. 7, 2014

(87) PCT Pub. No.: WO2013/065075
PCT Pub. Date: May 10, 2013

(65) Prior Publication Data
US 2014/0338385 A1 Nov. 20, 2014

(51) Int. Cl.
F25B 45/00 (2006.01)
B65D 83/20 (2006.01)
F17C 13/04 (2006.01)
F16L 29/02 (2006.01)
B65D 83/14 (2006.01)
B65D 83/24 (2006.01)

(52) U.S. Cl.
CPC .......... *F25B 45/00* (2013.01); *B65D 83/207* (2013.01); *B65D 83/756* (2013.01); *F16L 29/02* (2013.01); *F17C 13/04* (2013.01); *B65D 83/24* (2013.01)

(58) Field of Classification Search
CPC ...... B65D 83/207; B65D 83/205; F25B 45/00
USPC .......................................... 222/182, 402.13
See application file for complete search history.

(56) References Cited

U.S. PATENT DOCUMENTS

| 3,907,012 | A | 9/1975 | Burke |
| 4,895,190 | A | 1/1990 | Gillen |
| 4,995,417 | A | 2/1991 | Naku |
| 5,305,784 | A | 4/1994 | Carter |
| 5,492,305 | A | 2/1996 | Kish |
| 5,586,748 | A | 12/1996 | Kish |

(Continued)

FOREIGN PATENT DOCUMENTS

| BE | 509789 A | 3/1952 |
| FR | 2691101 A1 | 11/1993 |

OTHER PUBLICATIONS

International Preliminary Report on Patentability in PCT/IT2011/000366 dated Nov. 22, 2013.

(Continued)

Primary Examiner — Cassey D Bauer
(74) Attorney, Agent, or Firm — Henry J. Cittone; Cittone & Chinta LLP

(57) ABSTRACT

A device for charging a primary fluid system, such as an air-conditioning or cooling system, closed and at a first pressure (P1), with a secondary fluid, comprises a dispensing cylinder of the secondary fluid, said cylinder containing the secondary fluid and a propellant fluid having a second pressure (P2) greater than said first pressure. Said cylinder further comprising a filler valve operable to allow/block the exit at least of the secondary fluid from the cylinder. A connection hood is partially superposed over the dispensing cylinder, fitted with connections means suitable for fluidically connecting said filler valve directly to said primary fluid system or to a connection pipe to said system.

19 Claims, 5 Drawing Sheets

(56) References Cited

U.S. PATENT DOCUMENTS

| | | | |
|---|---|---|---|
| 6,880,587 B1* | 4/2005 | Carter | B60H 1/00585 |
| | | | 141/383 |
| 2003/0178098 A1* | 9/2003 | Brass | F16L 29/02 |
| | | | 141/383 |
| 2005/0167528 A1 | 8/2005 | Hsiao | |
| 2008/0116223 A1* | 5/2008 | Stradella | B65D 83/386 |
| | | | 222/162 |
| 2008/0128646 A1* | 6/2008 | Clawson | A61M 39/26 |
| | | | 251/149.1 |
| 2010/0139296 A1* | 6/2010 | Eggen | B60H 1/00585 |
| | | | 62/77 |

OTHER PUBLICATIONS

International Search Report in PCT/IT2011/000366 dated Sep. 19, 2012.

* cited by examiner

DEVICE FOR CHARGING PRESSURIZED SYSTEMS

CROSS-REFERENCE TO RELATED APPLICATIONS

This application is a U.S. national phase application of international patent application PCT/IT2011/000366, filed Oct. 31, 2011, the disclosure of which is incorporated herein by reference in its entirety.

The present invention relates to a dispensing device for charging a fluid system, such as an air-conditioning or cooling system, closed at a certain pressure, with a secondary fluid. For example the fluid system is an air-conditioning system of a vehicle, wherein the conditioning fluid is pressurized, and the secondary fluid is an additive, a tracer for identifying leaks, a mating substance, a lubricant, etc.

Various methods exist for injecting a secondary fluid in a pressurized conditioning system. The secondary fluid is normally contained in a predetermined quantity in a container suitable for being fluidically connected to the conditioning system. In some cases, said conditioning system is provided with a low pressure inlet, as a result of which there are no particular difficulties in transferring the secondary fluid from the container to the conditioning system circuit. For example cartridges of a cylindrical shape having one end fitted with a connection fitting to the conditioning system, for example through a pipe, and suitable for co-operating with a manually operable piston to push the secondary liquid out of the cartridge, are used as containers.

However, if the secondary fluid needs to be injected directly into the pressurized circuit, for example because no low pressure inlet has been provided, it is harder to transfer the secondary liquid from the container to the pressurized system, in that the force exerted by the primary pressurized liquid when the system is placed in fluidic communication with the container of the secondary fluid must be overcome.

U.S. Pat. No. 5,826,636 suggests overcoming this problem by using a mechanical system to operate the piston which acts on the fluid contained in the cartridge, so as to multiply the force exerted manually by the operator.

However, if the pressure of the fluid inside the pressurized system is significantly higher than natural pressure, for example 7-8 bar, the operator encounters a certain difficulty in any case, or in some cases even the impossibility, of operating the mechanical device which moves the piston.

The purpose of the present invention is to propose a fluid dispensing device which overcomes the aforementioned drawbacks, and in particular is suitable for facilitating the injection of the secondary fluid in a pressurized fluid system, even in the case of high pressures of said fluid in the system.

Such purpose is achieved by a dispensing device according to claim 1. The dependent claims show preferred or advantageous embodiments of the dispensing.

The characteristics and advantages of the device according to the invention will be more clearly comprehensible from the description given below of its preferred embodiments, made by way of a non-limiting example, with reference to the attached drawings, wherein.

Figure 1:
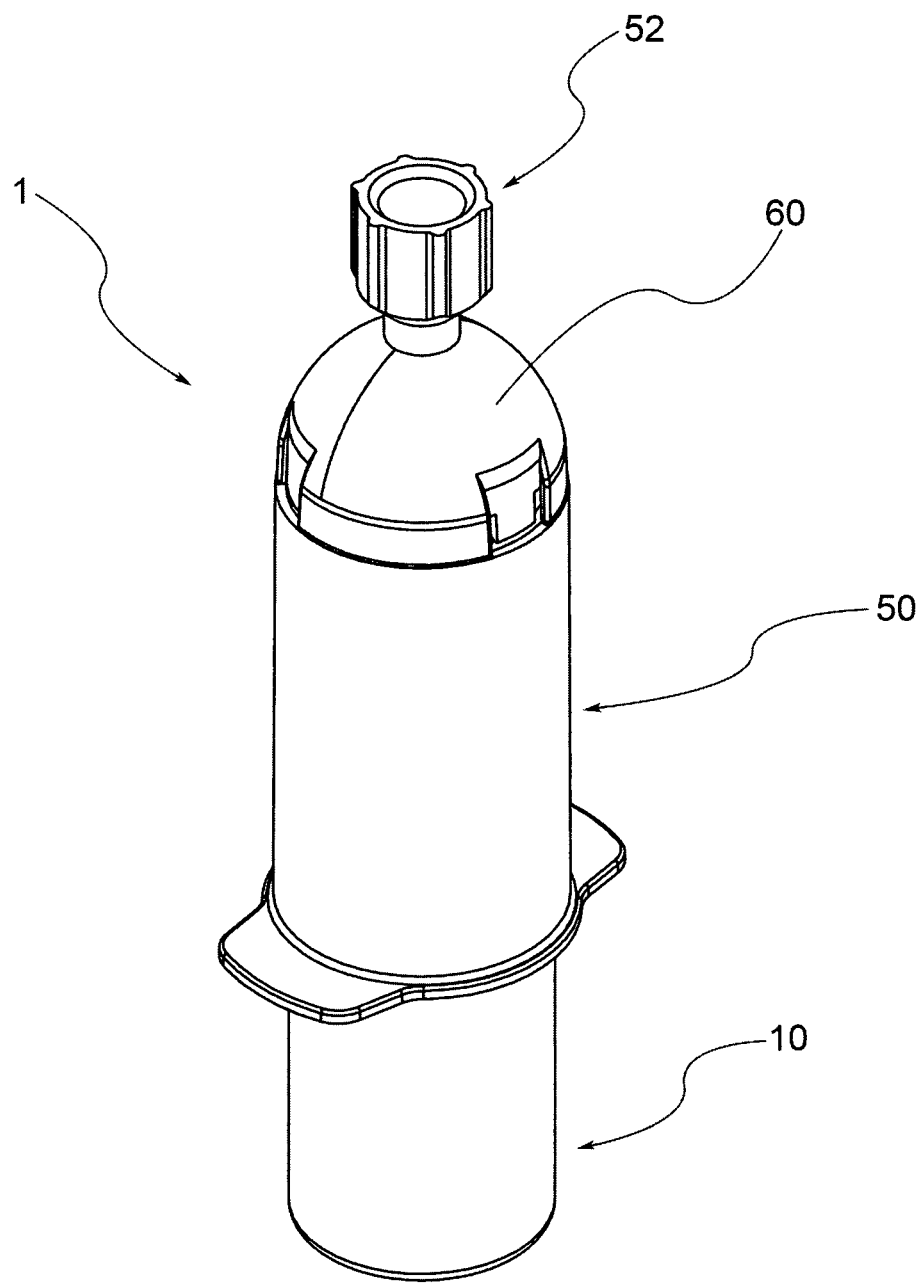
FIG. 1 is a perspective view in elevation of the dispensing device according to the invention, in a preferred embodiment.
Figure 2:
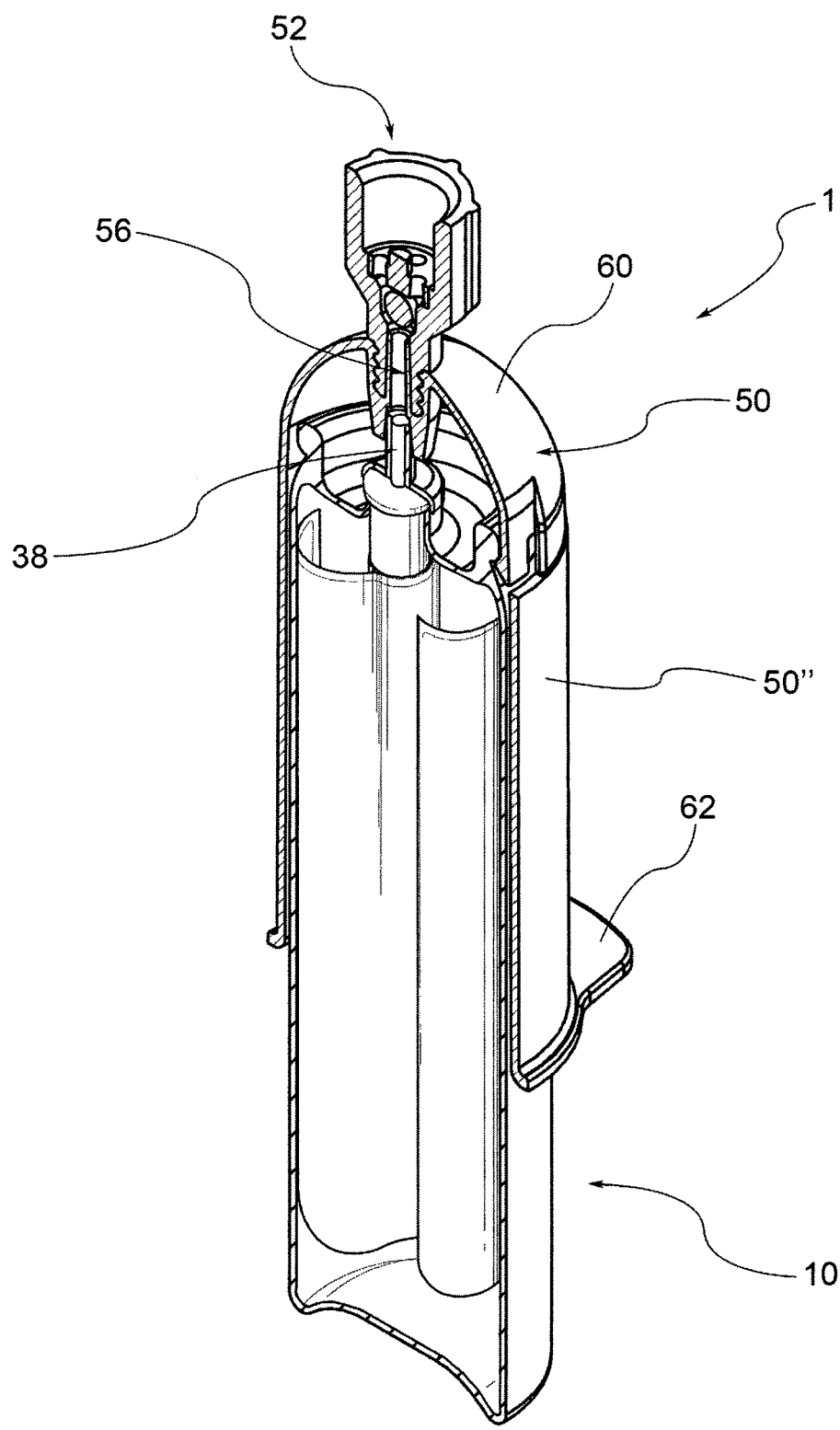
FIG. 2 is a cross-sectional perspective view of the device.
Figure 3:
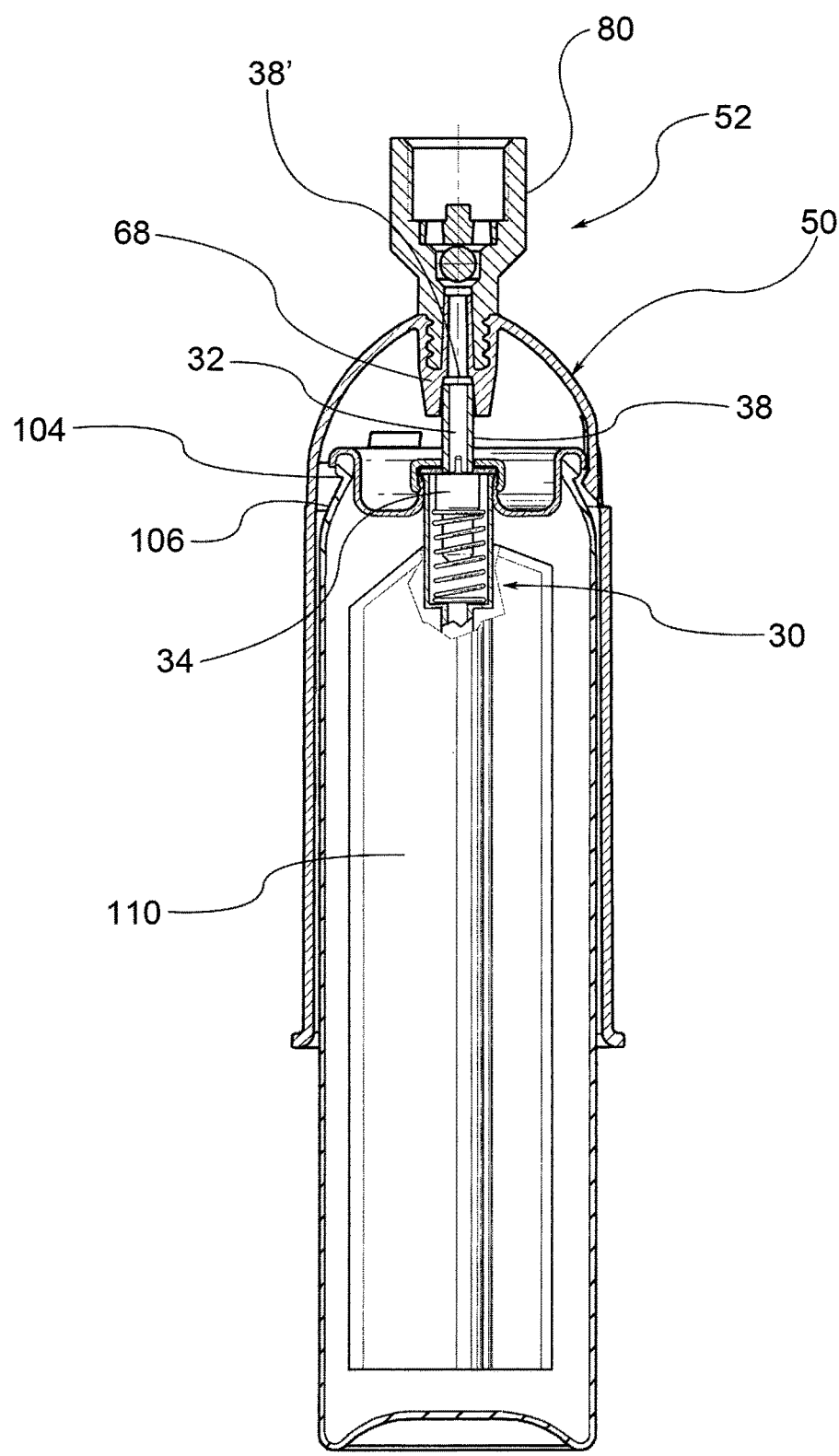
FIGS. 3 and 3a are two axial cross-sections of the device, in the inactive position and in the filling position, respectively.
Figure 3A:
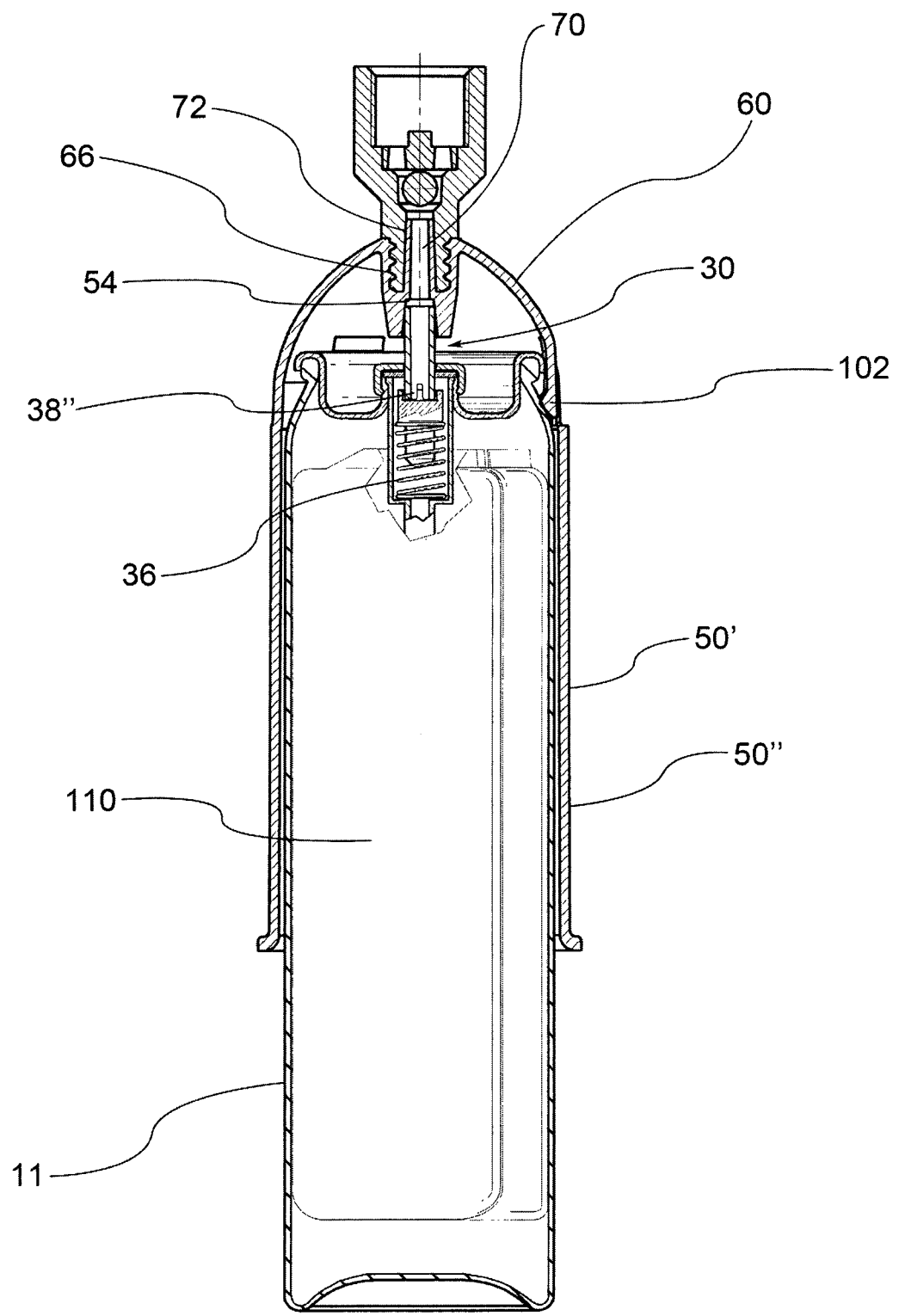

In said drawings, reference numeral 1 globally denotes a dispensing device according to the invention for charging a primary fluid system, such as an air-conditioning or cooling system, with a secondary fluid. The primary fluid inside the system is at a first pressure P1, for example in the range 2-9.5 bar, depending on the type of application and the type of primary fluid used.

According to a general embodiment, the dispensing device 1 comprises a dispensing cylinder 10 of the secondary fluid. Said cylinder 10 contains, besides the secondary fluid for charging, a propellant fluid, such as nitrogen, having a second pressure P2, greater than the pressure P1 of the primary fluid, for example in the range 7.5-12 bar. The dispensing cylinder 10 further comprises a filler valve 30 operable to allow/prevent the exit at least of the secondary fluid from the cylinder 10. Inside the dispensing cylinder 10 the secondary fluid may be mixed with the propellant fluid or, more preferably, as will be described further below, may be separated from the propellant fluid, so that only the secondary fluid can exit the cylinder.

The dispensing cylinder 10 is partially inserted in a connection hood 50. Said connection hood 50 is fitted with connections means 52 suitable for fluidically connecting the filler valve 30 directly to the primary fluid system or to a connection pipe leading to said system. In other words, said connection means 52 may made so as to allow a direct connection with a connection inlet of the primary fluid system, or a connection with a fitting provided at the end of a connection pipe, such as a flexible hose, provided with another fitting at the opposite end for connection to the primary fluid system.

Advantageously, in any case, said connection means 52 are suitable for allowing a detachable connection to the primary fluid system.

In one embodiment, the filler valve 30 comprises a filler duct 32 and an obturator element 34 movable between a forward closed position of said filler duct 32 and a rearward open position of said filler duct 32. For example the obturator element 34 is normally kept in the forward, closed position by an elastic element such as a spring 36.

Either the dispensing cylinder 10 or the connection hood 50 or both are axially movable in relation to each other so as to move the obturator element 34 of the filler valve between the forward position and the rearward position. In other words, the connection hood 50 also acts as an actuator means for operating the filler valve 30.

In an alternative embodiment (not shown in the drawings), the charging device 1 comprises separate, manually operated actuator means to operate said valve means.

In a preferred embodiment, the filler duct 32 of the filler valve is performed in a filler stem 38 having a distal end 38' projecting from the cylinder 10. Inside the cylinder, the proximal end 38" of the filler stem 38 is connected to the obturator element 34. The connection hood 50 forms an axial abutment 54 for said distal end 38' of the filler stem, in such a way that pushing the cylinder 10 against the connection hood 50, the connection hood 50 reacts, making the filler stem 38 and thereby the obturator element 34 move backwardly.

In particular, the connection hood 50 has a dispensing nozzle 56 defining said axial abutment 54 for said distal end 38' of the filler stem. Such dispensing nozzle 56 couples fluidically to the connection means 52. In other words, the dispensing nozzle 56 is in fluidic communication with the inside of the cylinder 10 by means of the filler stem 38 of the filler valve, and places said stem 38 in communication with the connection means 52.

In a particularly advantageous embodiment, the dispensing cylinder 10 is of a substantially cylindrical shape and the connection hood 50 comprises a hollow cylindrical body 50' wherein said cylinder 10 is partially housed. In other words, cylinder 10 and hood 50 are made and coupled to each other so as to form an assembly shaped and manoeuvrable like a syringe.

In one embodiment, the connection hood 50 has a front end in the shape of a spherical cap 60 which surmounts the end of the cylinder 10 from which the filler stem 38 projects. The dispensing nozzle 56 is obtained in said spherical cap 60 of the connection hood 50, the connection means 52 being positioned on the top of said spherical cap 60. In one embodiment which permits a reduction of the dimensions of the charging device, the dispensing nozzle 56 extends inside the spherical cap 60, i.e. is positioned inside the wall of the connection hood which forms said cap. In other words, the distal end 38' of the filler stem 38 projects from the outer container of the dispensing cylinder 10, but remains inside the connection hood 50.

The connection hood 50 has then a cylindrical side wall 50" which extends to at least halfway along the length of the dispensing cylinder 10.

On the side opposite the spherical cap 60, that is at its insertion aperture for the cylinder, the connection hood 50 is fitted with at least one pair of radial grip tabs 62. Thanks to such radial grip tabs 62, the connection hood 50 can thereby be easily restrained while acting on the rear end of the cylinder 10 to push it into a forward position.

In a preferred embodiment, the dispensing nozzle 56 is formed integrally with the connection hood 50, for example by means of injection moulding.

In a preferred embodiment, moreover, the connection means 52 are detachably attached to the dispensing nozzle 56. For example the connection means 52 are sealingly screwed to the dispensing nozzle 56.

In a particularly advantageous embodiment, the dispensing nozzle 56 and the connection means 52 are coupled to each other with a "Luer"-type coupling.

More in detail, the dispensing nozzle 56 comprises a hollow portion defined by a side wall 66 and by an end wall 68. Said end wall 68 is traversed by a filler hole 70 in which the annular abutment shoulder 54 for the distal end of the filler stem is made. The side wall 66 is internally threaded for tight screwing to the connection means 52.

An axial projection 72 traversed by the filler hole 70 extends from the end wall 68 of the dispensing nozzle 56 towards the outside of the connection hood 50. Advantageously, said axial projection 72 is of a conical shape, that is tapered outwardly.

In one embodiment, the connection means 52 comprise a fitting 80 having a threaded connection portion 82 for screwing tight to the dispensing nozzle 56 and a hollow connection body 84 having an internal threading for connection to the primary fluid system or to a connection pipe to said system. The threaded connection portion 82 is traversed by an axial hole 86 suitable for receiving the axial projection 72 of the dispensing nozzle 56. Said axial hole 86 has a complementary tapering to that of the axial projection 72 of the dispensing nozzle 56 ("Luer" coupling).

It is to be noted that the threaded connection between the side wall 66 of the dispensing nozzle 56 and connection means 52 makes it possible to further secure the connection means 52 to the connection hood 50 even in the case of very high pressures at play, which would tend to cause the detachment of said elements. The coupling between the conical surfaces of the axial projection 72 and the axial hole 86, combined with the threaded connection of the respective parts 56, 52, is also called a "Luer lock".

Advantageously, a check valve 90, such as a ball valve, suitable for preventing a flow of primary fluid towards the cylinder and therefore to prevent the risk of explosion of the latter, is inserted in the connection body 84.

Figure 4:
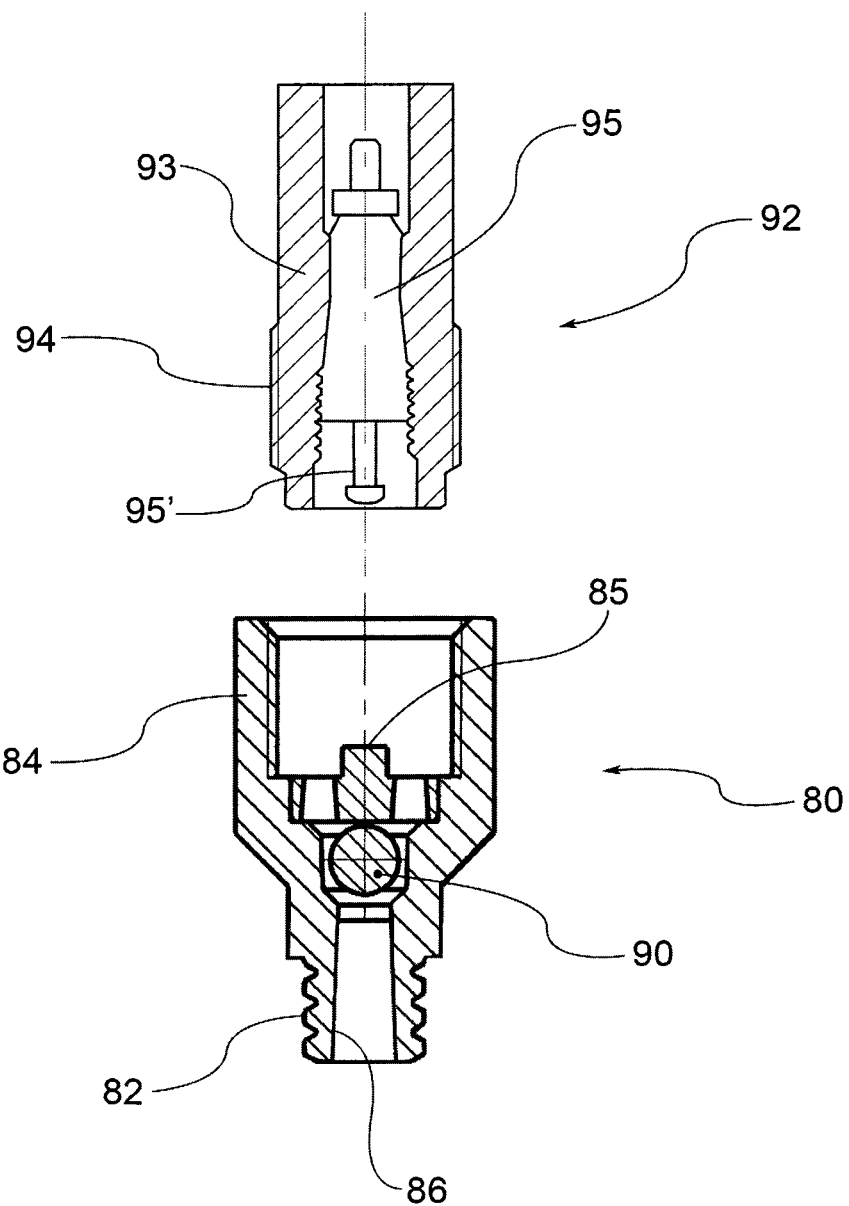
FIG. 4 is a view in axial cross-section and with separated parts of the connection fitting only of the device and of a Schrader valve connectable to said fitting.

According to a preferred embodiment, the hollow connection body 84 is suitable for screwing to an access or filler valve 92 (FIG. 4) forming part of a fitting of the primary fluid system or of a fitting of a connection pipe to said system. The access valve 92 has a body 93 with an outer threading 94 for screwing into the hollow connection body 84. Inside it, the access valve 92 has a "Schrader" valve 95, i.e. a valve fitted with a moving element 95' which, when pressed, permits the passage of the fluid therethrough. When the access valve 92 is fully screwed into the connection body 84, an axial compression element 85 provided in said body 84 presses the moving element 95' of the Schrader valve 95 opening it and thereby permitting the transit of the secondary fluid through said valve.

Returning to the coupling between the dispensing cylinder 10 and the connection hood, in one embodiment the cylinder 10 and the connection hood are provided with snap coupling means 100.

For example said snap coupling means comprise elastic tabs 102 obtained in the side wall 50" of the connection hood 50 and corresponding radial recesses 104 made in the side wall of the cylinder 10 and suitable for being snap engageable by said flexible tabs 102. In a preferred embodiment, said radial recesses 104, forming for example a single annular recess, are connected at the back with the outer surface of the cylinder by means of an inclined plane 106 along which the flexible tabs 102 slide, flexing outwards, when the cylinder is pushed further against the connection hood 50.

In a preferred embodiment, shown in the drawings, the secondary fluid is contained in an inner casing 110 sealed tight inside the dispensing cylinder 10, said secondary fluid being at a third pressure P3 below the propellant fluid pressure P2. The inner casing 110 is formed at least partially of a collapsible wall, so that, when the filler valve 30 is opened, the propellant fluid acts on said inner casing 110, compressing it and thereby causing the exit of the secondary fluid.

In other words, the cylinder 10 comprises an outer container 11, or jacket, which seals tight the inner casing 110, the propellant fluid being contained in the space between the outer surface of the inner casing 110 and the inner surface of the outer container 11.

For example the inner casing is in the form of a bag or has a membrane wall.

Consequently, the introduction of the secondary fluid into the pressurized fluid system takes place as follows.

The dispensing cylinder is provided, in the inner casing of which a predetermined quantity of the secondary fluid is contained. The cylinder is pressurized with a propellant fluid which the inner casing is immersed in. Since in the absence of operation of the valve means, said valve means hermetically close the inner casing, despite the greater pressure of the propellant fluid compared to the secondary fluid tending to compress the inner casing, said casing does not collapse and the secondary fluid remains inside it.

To dispense the secondary fluid, the connection means are connected to an access or filler valve of the pressurized fluid system, for example by means of a connection pipe.

Once the charger device is connected to the primary fluid circuit, the operator can activate the valve means of the cylinder. Thanks to the fact that the pressure of the propellant fluid is greater than both that of the secondary fluid and that of the primary fluid, as soon as the valve means connect the inner casing with the connection means, the propellant fluid acts on the walls of the inner casing, compressing them and thereby making the secondary fluid exit. The secondary fluid, thrust by the pressure of the propellant fluid, overcome the pressure exerted by the primary fluid and thereby enters the system.

It is clear that the operator needs only perform the opening manoeuvre of the valve means, that is, for example, overcome the spring which normally keeps the passage in the filler stem closed, while the work of moving the secondary fluid from the inner casing to the system to be charged is performed by the propellant fluid.

In one advantageous embodiment, the manual action of the operator on the valve means is further facilitated by the syringe structure of the dispensing cylinder-connection hood assembly. In fact, rather than acting directly on the valve means, the operator can push the cylinder from the rear part, that is acting on the bottom, contemporarily restraining the connection hood with the radial tabs. Among other things this method makes it possible to free the front end of the cylinder and therefore to connect the connection means in alignment with the filler stem, thereby favouring the exit of the secondary fluid from the cylinder.

It is to be noted moreover that the use of a casing inside the cylinder makes it possible to prevent the propellant fluid from coming into contact with the secondary fluid and above all from coming out of the cylinder.

A person skilled in the art may make modifications, adaptations and replacements of parts with others functionally equivalent to the embodiments of the charging device according to the invention so as to satisfy contingent requirements while remaining within the sphere of protection of the following claims. Each of the characteristics described as belonging to one possible embodiment may be realised independently of the other embodiments described.

The invention claimed is:

1. A dispensing device for charging a primary fluid system, such as an air-conditioning or cooling system, closed and at a first pressure (P1), with a secondary fluid, comprising:
   (a) a dispensing cylinder of the secondary fluid, said dispensing cylinder containing the secondary fluid and propellant fluid having a second pressure (P2) greater than said first pressure, said dispensing cylinder further comprising a filler valve suitable for being operated to allow or prevent the exit at least of the secondary fluid from the cylinder;
   (b) a connection hood partially superposed over the dispensing cylinder, said connection hood being fitted with connection means suitable for fluidically connecting said filler valve directly to said primary fluid system or to a connection pipe to said primary fluid system,
   wherein said filler valve comprises a filler duct and an obturator element movable between a forward, closed position of said filler duct and a rearward, open position of said filler duct,
   the dispensing device being characterised in that the dispensing cylinder is of a substantially cylindrical shape and the connection hood comprises a hollow cylindrical body wherein said dispensing cylinder is partially housed, in such a way that said dispensing cylinder and said hood are coupled and axially movable in relation to each other like a syringe so as to move the obturator element of the filler valve between the forward position and the rearward position and wherein said connection hood is fitted, at its insertion aperture for the cylinder, with at least one pair of radial grip tabs.

2. The device of claim 1, wherein the filler duct of the filler valve is obtained in a filler stem having a distal end projecting from the cylinder, and wherein said connection hood forms an axial abutment for said distal end of the filler stem.

3. The device of claim 2, wherein said connection hood has a dispensing nozzle defining said axial abutment for said distal end of the filler stem, the connection means being fluidically coupled to said dispensing nozzle.

4. The device of claim 3, wherein the dispensing nozzle is formed integrally with the connection hood.

5. The device of claim 3, wherein the connection means are detachably attached to the dispensing nozzle.

6. The device of claim 5, wherein the connection means are sealingly screwed to the dispensing nozzle.

7. The device of claim 6, wherein the dispensing nozzle comprises a hollow portion
   defined by a side wall and by an end wall, said end wall being traversed by a filler hole, in said filled hole being performed an annular abutment shoulder for the distal end of the filler stem, said side wall being internally threaded for tight screwing to the connection means.

8. The device of claim 7, wherein an axial projection traversed by said filler hole extends from the end wall towards the outside of the connection hood.

9. The device of claim 8, wherein said radial projection is of a conical shape and tapers outwardly.

10. The device of claim 9, wherein the connection means comprise a fitting having a threaded connection portion for screwing to the dispensing nozzle and a hollow connection body having an internal threading for connection to the primary fluid system or to a connection pipe to said primary fluid system, said threaded connection portion being traversed by an axial hole suitable for receiving the axial projection of the dispensing nozzle.

11. The device of claim 10, wherein a check valve is inserted in the connection body.

12. The device of claim 3, wherein the dispensing nozzle and the connection means are coupled to each other with a luer-type coupling.

13. The device of claim 1, wherein the cylinder and the connection hood are provided with snap coupling means.

14. The device of claim 13, wherein said snap coupling means comprise elastic tabs obtained in the side wall of the connection hood and corresponding radial recesses made in the side wall of the cylinder and suitable for being snap engaged by said flexible tabs.

15. The device of claim 1, wherein the secondary fluid is contained in an inner casing sealed tight inside the dispensing cylinder, said secondary fluid being at a third pressure (P3) below the propellant fluid pressure, said inner casing being at least partially formed of a collapsible wall.

16. The device of claim 15, wherein the cylinder comprises an outer container, or jacket, which seals tight said inner casing, the propellant fluid being contained in the space between the outer surface of the inner casing and the inner surface of the outer container.

17. The device of claim 1, wherein the connection means are suitable for screwing to an access or filler valve, and are of the type fitted internally with a schrader valve, forming part of a fitting of the primary fluid system or of a fitting of a connection pipe to said system.

18. A dispensing device for charging a primary fluid system, such as an air-conditioning or cooling system, closed and at a first pressure (P1), with a secondary fluid, comprising:
 (a) a dispensing cylinder of the secondary fluid, said dispensing cylinder containing the secondary fluid and propellant fluid having a second pressure (P2) greater than said first pressure, said dispensing cylinder further comprising a filler valve suitable for being operated to allow or prevent the exit at least of the secondary fluid from the cylinder;
 (b) a connection hood partially superposed over the dispensing cylinder, said connection hood being fitted with connection means suitable for fluidically connecting said filler valve directly to said primary fluid system or to a connection pipe to said primary fluid system,
 wherein said filler valve comprises a filler duct and an obturator element movable between a forward, closed position of said filler duct and a rearward, open position of said filler duct,
 the dispensing device being characterised in that the dispensing cylinder is of a substantially cylindrical shape and the connection hood comprises a hollow cylindrical body wherein said dispensing cylinder is partially housed, in such a way that said dispensing cylinder and said hood are coupled and axially movable in relation to each other like a syringe so as to move the obturator element of the filler valve between the forward position and the rearward position;
 wherein the filler duct of the filler valve is obtained in a filler stem having a distal end projecting from the cylinder, and wherein said connection hood forms an axial abutment for said distal end of the filler stem;
 wherein said connection hood has a dispensing nozzle defining said axial abutment for said distal end of the filler stem, the connection means being fluidically coupled to said dispensing nozzle;
 wherein the connection means are detachably attached to the dispensing nozzle; and
 wherein the connection means are sealingly screwed to the dispensing nozzle.

19. A dispensing device for charging a primary fluid system, such as an air-conditioning or cooling system, closed and at a first pressure (P1), with a secondary fluid, comprising:
 (a) a dispensing cylinder of the secondary fluid, said dispensing cylinder containing the secondary fluid and propellant fluid having a second pressure (P2) greater than said first pressure, said dispensing cylinder further comprising a filler valve suitable for being operated to allow or prevent the exit at least of the secondary fluid from the cylinder;
 (b) a connection hood partially superposed over the dispensing cylinder, said connection hood being fitted with connection means suitable for fluidically connecting said filler valve directly to said primary fluid system or to a connection pipe to said primary fluid system,
 wherein said filler valve comprises a filler duct and an obturator element movable between a forward, closed position of said filler duct and a rearward, open position of said filler duct,
 the dispensing device being characterised in that the dispensing cylinder is of a substantially cylindrical shape and the connection hood comprises a hollow cylindrical body wherein said dispensing cylinder is partially housed, in such a way that said dispensing cylinder and said hood are coupled and axially movable in relation to each other like a syringe so as to move the obturator element of the filler valve between the forward position and the rearward position;
 wherein the cylinder and the connection hood are provided with snap coupling means; and
 wherein said snap coupling means comprise elastic tabs obtained in the side wall of the connection hood and corresponding radial recesses made in the side wall of the cylinder and suitable for being snap engaged by said flexible tabs.

\* \* \* \* \*